(12) United States Patent
Metzler et al.

(10) Patent No.: US 9,958,269 B2
(45) Date of Patent: May 1, 2018

(54) POSITIONING METHOD FOR A SURVEYING INSTRUMENT AND SAID SURVEYING INSTRUMENT

(71) Applicant: HEXAGON TECHNOLOGY CENTER GMBH, Heerbrugg (CH)

(72) Inventors: Bernhard Metzler, Dornbirn (AT); Stefan Martin Benjamin Gächter Toya, St. Gallen (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 194 days.

(21) Appl. No.: 14/902,272

(22) PCT Filed: Jul. 3, 2014

(86) PCT No.: PCT/EP2014/064264
§ 371 (c)(1),
(2) Date: Dec. 30, 2015

(87) PCT Pub. No.: WO2015/001063
PCT Pub. Date: Jan. 8, 2015

(65) Prior Publication Data
US 2016/0146604 A1   May 26, 2016

(30) Foreign Application Priority Data
Jul. 4, 2013   (EP) ...................................... 13175115

(51) Int. Cl.
*G01C 15/00*   (2006.01)
*G01C 21/20*   (2006.01)
*G06K 9/00*   (2006.01)

(52) U.S. Cl.
CPC ............ *G01C 15/002* (2013.01); *G01C 15/00* (2013.01); *G01C 21/20* (2013.01); *G06K 9/00664* (2013.01)

(58) Field of Classification Search
CPC ............................. G01C 15/002; G01C 15/008
USPC .......................... 33/228, 1 T, 1 CC, 286, 290
See application file for complete search history.

(56) References Cited

U.S. PATENT DOCUMENTS

| 6,473,166 B1* | 10/2002 | Ohishi ................. G01C 15/002 356/141.1 |
| 8,131,118 B1 | 3/2012 | Jing et al. |
| 8,331,624 B2* | 12/2012 | Braunecker .............. G01C 1/04 382/106 |
| 8,483,512 B2 | 7/2013 | Moeller |
| 9,316,496 B2* | 4/2016 | Green ...................... G01C 3/32 |

(Continued)

FOREIGN PATENT DOCUMENTS

| EP | 1 347 267 A1 | 9/2003 |
| EP | 2 405 236 A1 | 1/2012 |

(Continued)

*Primary Examiner* — Christopher Fulton
(74) *Attorney, Agent, or Firm* — Maschoff Brennan

(57) ABSTRACT

Some embodiments of the invention relate to a method for determining the position data of a geodesic surveying instrument by comparing of a reference data set extracted from data of an image of the surroundings of the surveying instrument position with position-referenced data sets which consists of data of a corresponding type, and determining the position data using the position reference of the selected position-referenced data set that has a comparatively important level of match with the reference data set.

22 Claims, 9 Drawing Sheets

(56) References Cited

U.S. PATENT DOCUMENTS

| | | | |
|---|---|---|---|
| 9,497,383 B2 * | 11/2016 | Lienhart | G01C 1/04 |
| 9,658,059 B2 * | 5/2017 | Metzler | G01B 11/14 |
| 2008/0226130 A1 | 9/2008 | Kansal et al. | |
| 2009/0105986 A1 * | 4/2009 | Staab | G01C 15/002 |
| | | | 702/151 |
| 2010/0250136 A1 | 9/2010 | Chen | |
| 2010/0303286 A1 | 12/2010 | Kim | |
| 2011/0064312 A1 | 3/2011 | Janky et al. | |
| 2011/0285592 A1 * | 11/2011 | Green | G01C 15/002 |
| | | | 342/451 |
| 2013/0093882 A1 | 4/2013 | Kotzur et al. | |
| 2014/0320603 A1 * | 10/2014 | Pettersson | G01C 15/002 |
| | | | 348/46 |
| 2015/0029489 A1 | 1/2015 | Metzler et al. | |
| 2017/0026636 A1 * | 1/2017 | Zahn | G01C 15/002 |
| 2017/0138730 A1 * | 5/2017 | Ohtomo | G01C 3/08 |

FOREIGN PATENT DOCUMENTS

| | | |
|---|---|---|
| EP | 2 142 884 B1 | 7/2012 |
| EP | 2 620 746 A1 | 7/2013 |
| JP | 2004226170 A | 8/2004 |
| WO | 03/032005 A2 | 4/2003 |

* cited by examiner

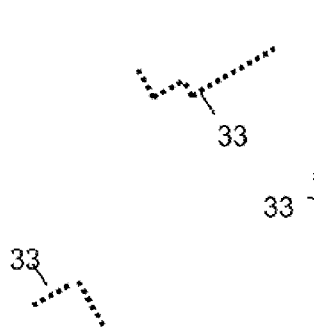
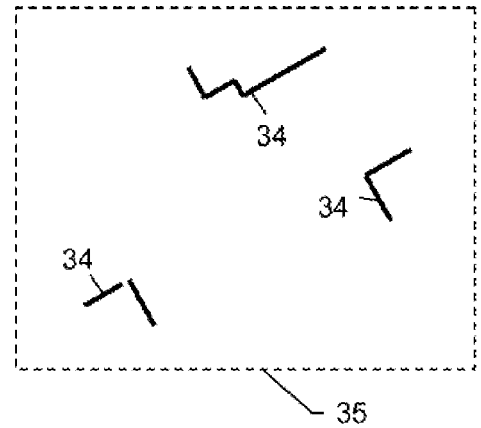
Fig 7a  Fig 7b
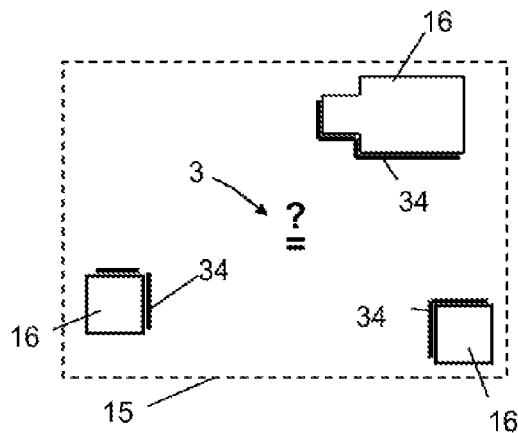
Fig 7c

POSITIONING METHOD FOR A SURVEYING INSTRUMENT AND SAID SURVEYING INSTRUMENT

FIELD OF THE INVENTION

The invention relates to a position finding method for a geodetic surveying instrument, to just such a geodetic surveying instrument and to just such a computer program product.

BACKGROUND

For recording properties of defined points in a measurement environment, particularly of data with a spatial reference, a multiplicity of measurement methods have been known since ancient times. In this case, the position and orientation of a surveying instrument and also direction, distance and angle in relation to measurement points are recorded as spatial standard data. One generally known example of such surveying instruments or geodetic instruments is the theodolite or a total station. Such instruments have angle and distance measurement functions that allow determination of direction and distance in relation to a selected target. In this case, the angle and distance variables are ascertained in the internal reference system of the instrument and, for absolute position finding, also need to be combined with an external reference system, for which purpose the position of the surveying instrument in the external reference system normally serves as a basis.

In principle, the station coordinates of the measuring instrument can be computed as what is known as free deployment from measurements pertaining to points that are already referenced absolutely in the deployment environment. These may be fixed and distinguished points that exist in the terrain, for example church spires or objects installed specifically for geodetic measurements, e.g. target markings on a building site. For correct position finding, the measurement data each need to be explicitly associated with the relevant reference points in this case. Such referencing for every single point measurement usually requires at least partial manual implementation, which is time consuming and error prone.

Therefore, EP 2142884.B1 discloses a position finding method that takes away from the necessary combination of point identification and recording of the measurement data that needs to be observed for the measurement. To this end, the necessary association of the measured points with their corresponding elements in one set of reference points is effected, following or progressively during deployment measurement, using the relative position of the points in relation to one another. The procedure can be performed in an automated fashion by a surveying instrument with an automatic target recognition function. A disadvantage of this method is that there needs to be a plurality of absolutely referenced points in the surroundings, and these points must furthermore be measurable. Furthermore, for automation, they need to be provided with markings that the surveying instrument can target, e.g. retro reflective prisms. Another disadvantage is that position finding accordingly requires a plurality of geodetic measurements to be performed, which normally requires expert knowledge and increased time involvement. In addition, performance of the position finding method disclosed in EP 2142884.B1 requires the appropriate set of reference points to have been selected in advance, that is to say in this respect requires certain prior knowledge of the location.

The position of a surveying instrument can alternatively be determined by means of a GNSS receiver mounted on the surveying instrument using individual satellites as reference points. However, a disadvantage is the lower resolution, particularly in respect of height determination, in comparison with referencing by means of geodetic measurement. In addition, the process is tied to the reception of GNSS signals, which is not available everywhere.

SUMMARY

Some embodiments of the present invention may provide an alternative and simplified position finding method for a geodetic surveying instrument.

Some embodiments of the present invention may allow fully automated position findings that can be performed quickly.

Some embodiments of the present invention may allow position finding without specific measurement to or from individual position references such as targetable environment markings or GNSS satellites.

Some embodiments of the present invention may allow position finding without the use of a further geodetic instrument and/or without geodetic measurement and without the use of position-indicating signals Some embodiments of the present invention may include simplified visual provisions of environment points or sections that are relevant to a geodetic measurement.

Some embodiments of the present invention may include the provisions of a geodetic surveying instrument for such a method.

The present invention pursues a novel approach in order to determine the position of a geodetic surveying instrument. According to the invention, the reference to referenced position information is set up not using individual position-referenced environment points, the position of which is ascertained by receiving position signals, such as GNSS signals, or geodetic measurement, but rather using characteristics of the deployment environment that allow explicit identification of the surveying instrument location. To this end, an image of the environment of the chosen deployment site is recorded over at least one contiguous region, with particularly environment elements recorded in the process, which are intended to be understood as points or regions of environment surfaces, covering the region with a prescribed minimum density in order to obtain a degree of information about the location environment that is sufficiently high for the further method steps. The image or a volume of data extracted therefrom is then collated with stored, for example in a database, volumes of data of a multiplicity of images of environments. That image that has the same content as the recorded image is sought. The stored images or volumes of data are position-referenced, i.e. the absolute position of the respective location, from which the respective stored image of the environment is obtained, is known or can be ascertained. The position values are also stored or retrievable. If a match is found between the recorded image and a database image, it can be assumed that the two are based on the same location. Therefore, the position data of the location for the stored image are also associated with the as yet unreferenced recording location for the recorded image.

According to the invention, the coordinates of the current positioning site are thus determined at least coarsely by identifying the corresponding georeferenced location from a multiplicity of georeferenced locations on the basis of images of environments and adopting position data of the corresponding, known positioning site, which, owing to the identity of the view of the environment, is identified as identical to the current site. Within the context of the invention, "(recording) location" in the sense of a site means a small-scale region whose boundaries may be fluent and that has features that can be used to explicitly identify it. Within the context of the invention, "deployment" (or "deployment site" and "position(ing)" (or "positioning site") mean a spot within a location or a small-scale region with an explicitly defined position. In other words, a "location" comprises a plurality of or many deployments or positionings, that is to say a plurality of spots within the same region, which means that these deployments (and the images recorded therefrom) have the same views of the environment. Since the respectively intended meaning is clear to a person skilled in the art in context, these and similar designations are used synonymously to some extent. According to the invention, "identity" or "the same" means that volumes of data of the images reproducing a view of the environment have a significant degree of match, i.e. match within certain tolerance limits. The basis used for determining the degree of match are measures of interval and similarity, such as Minkowski distance, Bhattacharyya distance, Kullback-Leibler distance or generally a distance matrix comprising various measures of distance, etc.

According to the invention, it is thus not necessary for the current deployment site of the geodetic surveying instrument from which the image of the environment is recorded to precisely match the known positioning site on which the position-referenced database image is based. Rather, within the context of the invention, deployment sites or positioning sites are identical, i.e. they are regarded as "the same", if they have a significant degree of match in the images of the environment in this regard. "Identification" of the current location is thus intended to be understood in the sense of "recognition" of the location, without this requiring the current deployment site of the geodetic surveying instrument and the georeferenced positioning site to match exactly. Rather, location identification can tolerate an offset between the current deployment and the georeferenced positioning site so long as a sufficient degree of match between the respective views of the environment is ensured. Hence, depending on the determined tolerance limits and also the accuracy or fineness or resolution of the volumes of data and data records used, the associated position data match the actual (but unknown) position data of the current deployment of the geodetic surveying instrument more or less coarsely, which means that the position data determined according to the invention are normally not accurate but rather coarse position information. In other words, the surveying instrument position ascertained according to the invention explicitly determines the location of the geodetic surveying instrument but does not yet determine the deployment as a precise position.

The method according to the invention is therefore used for coarse position finding for the current deployment. In this case, the position finding is effected with sufficient coarseness for the surveying instrument position provided according to the invention to be able to be used to determine the actual or precise position data (in the sense of fine determination of the current position) using further methods by virtue of the position data of the current deployment or of the identified location that are ascertained according to the invention being able to be taken as a basis for retrieving position reference information from a database, which position reference information is used for subsequent precise position finding, i.e. refined determination of the position data or determination of the deployment.

By way of example, the position data of the current deployment can be ascertained accurately/finely by virtue of subsequent performance of geodetic measurement of a plurality of, particularly at least three, absolutely referenced targets in the environment as position reference information according to the prior art. Since, on the basis of the method according to the invention, the location of the surveying instrument is identified, georeferenced geodetic targets situated at the location can be retrieved from a database associated with this location, which can be accomplished in automated fashion. Geodetic measurement using the distance and angle measurement function of the surveying instrument for targetable, e.g. as a result of equipment with retroreflectors, targets of this kind then results in more accurate position finding by means of known geometric principles, for example on the basis of the method disclosed in EP 2142884.B1. To this end, selection by the user can involve points being overlaid on the image of the environment. In particular, such measurement can alternatively be carried out in fully automated fashion by a surveying instrument with an automatic sighting functionality, as disclosed in EP 10168771.3, for example. In other words, the method according to the invention identifies the current location of the geodetic surveying instrument and this provides a coarse position information item that is the basis or prerequisite for a subsequent method for determining a fine position that meets geodetic precision demands in all cases.

An image of the environment can be produced in various ways. According to the invention, individual environment elements are recorded in a nonspecific manner. Instead, the recording range is mapped completely in the sense that the environment is captured "comprehensively", with the quality of coverage reaching a prescribed lower limit. According to the invention, the environment elements are selected arbitrarily and at random in this case in the sense that the selection criteria are not specifically dependent on the environment. In this respect, the environment data are produced without prior knowledge. By way of example, environment elements are targeted only to the effect that angular intervals between the individual measurements are prescribed, which produces a dot pattern, rather than to the effect that distinctive environment points such as the spire of a steeple or the corners of an ashlar or environment elements provided with special markings are specifically recorded. The maximum resolution of the image is limited by the technical capabilities of the recording means. The latter therefore needs to be chosen such that the achievable coverage density of the environment elements and hence the density of information about the environment is sufficiently able to identify a match sufficient to be reliably by virtue of the inventive collation with the position-referenced images. In particular, photographic recording by means of a digital camera or three-dimensional recording, for example produced by a laser scan, is suitable for the method according to the invention. The photography may be black-and-white recording, color photography with a color depth of 24 bits, for example, or recording just over a particular spectral range. When a digital camera is used, the minimum density with which the recorded environment elements cover the recording range is prescribed by the number of pixels in the image sensor, for example, which is between 0.5 megapixel and 16 megapixels, particularly between 2 megapixels and 8 megapixels, for example, for an image sensor area of typically 5.76 mm by 4.29 mm. When a laser scanner is used, the minimum density, for example for a dot interval, is between 500 mm and 0.5 mm at a distance of 10 m to the location, particularly between 100 mm and 2 mm at a distance of 10 m to the location, specifically between 50 mm and 5 mm at a distance of 10 m to the location. Accordingly, a geodetic surveying instrument according to the invention whose position needs to be determined has at least one digital camera or a unit for producing images of the environment with depth information, e.g. a laser scanner or a RIM camera. A geodetic surveying instrument having a distance and angle measurement unit that has a scan module and a scan functionality is described in EP 12153163, for example, which was filed on Jan. 30, 2012 by the same applicant. It is also possible for a 3D image to be produced, for example by means of semiglobal matching, from two-dimensional camera images with a slightly offset recording orientation. In this case, an image does not necessarily consist of the recording of textures or surfaces but rather can also consist exclusively of mutually correlated, in particular geometrically arranged, distance measurements. By way of example, such range imaging therefore provides a two-dimensional arrangement of distance measurements and hence a kind of three-dimensional image of the captured field of view. The measurements may also be associated with a texture-capturing image, however. By way of example, brightness and distance can be recorded for each image point, so that these very brightness values and distances are available for each image information item, which consists of the position of an image point, for example. However, a distance measurement can also be arranged relative to other distance measurements, which means that it is also possible to dispense with knowledge of the position of each image point for the recording site. As a result, it is possible to dispense with complete evaluation of the captured visual range, for example, so that higher processing speeds can be accomplished with subwindowing or subframing, for example.

The images can reproduce a different region of the environment. According to the invention, a capture range as corresponds to a single frame recording using the technical capabilities of a commercially available camera is sufficient, that is to say normally an image angle of approximately 47°. In principle, the method according to the invention can itself be performed using much smaller environment regions. Such relatively small environment details can be obtained, by way of example, when using digital photography with an image angle of 12°, in the case of one-dimensional all-round (360°) laser scan in just one, at least largely horizontal plane, or in the case of a recording with an image angle of 1.5°, as can be produced by an ATR (automatic target recognition) camera of a geodetic surveying instrument, for example. Depending on the environment, image type and degree of image detail, such a small environment detail can be sufficient to produce collatable volumes of data therefrom that allow sufficiently reliable match detection. Ideally, to increase the robustness of a match, a larger environment region is captured, for example an angular range of at least 70°, particularly between 90° and 270°, specifically of at least 130°, in an at least largely horizontal orientation at a defined vertical opening angle, the absolute value of which is in the value range from 10° to 270°, particularly between 20° and 120°, specifically between 40° and 90°, for example. In particular, the invention allows the entire perimeter of the deployment site to be recorded, that is to say, if need be multistep, recording of an image over an angular range of 360° for a vertical opening angle of 60°, for example, which produces a panoramic image. An image can also consist of a combination of a plurality of images that each show a different environment section. By way of example, four recordings that are offset by 90° in a horizontal direction and each have a recording range of much less than 90°, e.g. 1.5°, can be regarded as one image.

Images are stored that reproduce environments in a suitable manner and whose respective recording site is likewise available with sufficient accuracy, this possibly involving photographs or three-dimensional recordings in line with thec recorded image, for example. Popular image management programs and file formats provide the option of combining photographic images and recording sites ("geotag"), for example. Alternatively or additionally, the invention provides the possibility of resorting to georeferenced data, from which it is possible to produce suitable position-referenced images of the environment or volumes of data for the recorded image in some form, if need be by allocating a computed virtual absolutely referenced recording site close to the ground. By way of example, the basis used may be a digital town model or images of the environment recorded remotely from the ground, such as aerial images, particularly those that contain information about rises in terrain or object heights, by means of measurement radiation, e.g. laser radiation, in addition to geographical data regarding the level of terrain. In the case of smaller-scale measurement, the invention allows a digital construction plan to be used as a basis for a position-referenced volume of data, for example. Thus, images of the environment that are produced from a construction plan and comprise the disposed building outlines are suitable and hence collatable for a recorded single-dimensional horizontal all-round laser scan. A combination of different data sources, for example a digital field map and an aerial image of this environment, to form an image or a common data record is also possible.

Collation of the recorded image with the site-referenced image is accomplished according to the invention by means of the volumes of data on which they are based or that are formed therefrom. In order to allow collation, the reference volume of data for the recording and the respective position-referenced volume of data must by nature have data of corresponding type, e.g. respective color values or relative brightness values for pixels and their coordinates in the image. This method step can be performed using the volumes of data of the whole image contents. Preferably, however, the invention involves a prior performance of feature extraction by using image processing for prior derivation of specific volumes of data from the images, which are then examined for a match, in a similar manner to the approach of content based image retrieval (CBIR). Such extracted volumes of data may be data for individual objects or accentuated points or subregions, e.g. dominant lines, the horizon in a panoramic image, corners of buildings or geometric shapes such as arc segments or straight lines, which have been ascertained by means of edge extraction or Hough transformation, for example, inter alia. If the image is three dimensional, the objects or points are likewise distributed in space. Alternatively, they can be projected onto a plane, for example a horizontal plane. The process involves the use of position and/or size in the image, the relative positions with respect to one another, a two-dimensional or three-dimensional pattern formed by such points, lines, areas or bodies, etc. Additionally, it is then possible, by way of example, to take the proximity relationships of the detected geometric primitives as a basis for constructing a topological graph of the image, whose volume of data is used for collation. According to the invention, features of at least to some extent statistical nature, for example color or grayscale value histograms or histograms of surface normals, brightness gradients, texture, color or wavelet signatures, or else features described by spatial color probability functions such as color edge cooccurrence diagrams or color correlograms, etc., are alternatively or additionally suitable. These can describe the whole image or just subregions thereof. In this case, an image detail can be selected by a window of defined size, which is slid or rasterized progressively, e.g. row by row, over the whole image (sliding window). Alternatively, subregions can also be defined by the surroundings of distinctive structures or points that have been extracted by means of Forstner operator, Harris-Laplace detector and/or Harris corner and edge detector, for example. Such subregions, i.e. the underlying partial data records, can then in turn be used as a basis for a volume of data that is to be produced. The collation of the volumes of data and identification of a match can then be effected, according to the invention, by evaluating a correlation function, for example. Thus, the crosscorrelation function for a reference volume of data produced from the recorded image and a respective stored position-referenced volume of data can be computed and evaluated. According to the invention, particularly descriptors, that is to say vectors having a specific number of numerical values that describe aspects of the content of an image or of a subregion thereof, for example the occurrence of particular structures, textures or color distributions, or that are based on a histogram of gradients (histogram of oriented gradients) or color shades, for example, are suitable for the collation. A descriptor can consist of a combination of different geometric and statistical data that explicitly describe the image content. It is then possible to look for a descriptor for one of the reference images, which descriptor is equivalent to such a feature vector of the recorded image taking account of a set threshold value and indicates a match. For the purposes of collation, image features, descriptors or images can be classified as a whole, particularly using certain feature vectors. Classification can be effected using a support vector machine (SVM), for example. A match can then be determined as appropriate on the basis of class association. In particular, collation can be effected using a combination of the various approaches.

A match is considered to exist for that stored position-referenced volume of data, that is to say that image, that is identical—within stipulated tolerances—to the reference volume of data obtained from the recorded image. If the collation is effected using descriptors, for example, then two images of the environment are assumed to match if the value of the difference between the two feature vectors thereof is below a stipulated amount. Should a plurality of images satisfy this criterion, then the one with the highest quality of match can be selected or collation can take place only within this group using additional features.

In order to increase reliability, the invention allows quality indicators to be produced for computation results. By way of example, such a quality indicator can denote the degree of match between a recorded image and an image from the database or the uncertainty that besets a match, as a result of which it is possible for corrective measures to be initiated by the user or in automated fashion if need be. Accordingly, prior to the actual collation, quality features for the uncertainty of derived volumes of data, for example of computed points, can be produced and if need be displayed and stored, or else the error in other information can be indicated.

Once a stored image matching the recorded image of the environment has been selected, the position data from the recording site thereof are also associated with the current location, since the previous method steps mean that it is possible to assume that the surveying instrument is at this georeferenced location. If the stored images are based on a digital town model, for example, it is possible, instead of computing a fictitious recording site for each stored image prior to the actual collation, to calculate one just for the selected image, which possibly allows processing time to be saved.

In a development according to the invention for the position finding method, position finding can be speeded up in another way by using a prior information item about a coarse position of the geodetic surveying instrument so as, particularly in automated fashion, to make a prior selection from the multiplicity of georeferenced images of environments by using only such images for the collation as have a reference to the prior information item. By way of example, a coarse position prior information item is obtained by virtue of a mobile radio receiver of the geodetic surveying instrument being used to narrow down the position thereof to the region of the mobile radio cell in which the mobile radio receiver is classified. Those images of the environment that belong to a database associated with this mobile radio cell or with this region are then used for collation.

An advantage of the position finding method according to the invention is its simple performance. The preparatory work required is just setup and possibly horizontal orientation of the geodetic surveying instrument. Apart from the surveying instrument according to the invention, that is to say the total station, the theodolite or a similar geodetic surveying instrument with a distance and angle measurement functionality, no further equipment is required. In contrast to a method based on geodetic measurements, for example, the method according to the invention requires no specific technical knowledge. A user can also be assisted with individual steps by automatic routines.

In particular, the method according to the invention affords the advantage that appropriate hardware and software can be used to perform all steps in automated fashion and automatically, which thus provides a fully automated method. To this end, a geodetic surveying instrument according to the invention is equipped with a camera, for example, that has a motor—which is controlled in automated fashion—for rotation about a horizontal axis in order to use said camera and image recording and image processing algorithms to automatically photograph a plurality of images of the environment and to produce a 360° image of the environment therefrom. The collation of the recording with the images from the database and the finding of matches can be performed by means of appropriate image and data processing algorithms from the prior art as described earlier on without user intervention. In particular, the method according to the invention affords the advantage that geodetic surveying instruments of the prior art do not require any additional hardware, since both a camera and a control motor are already present. Hence, in this respect, no additional production costs arise. By contrast, a geodetic surveying instrument for position finding by means of GNSS requires a GNSS receiver, which generates additional production costs, apart from the fact that GNSS reception is often unavailable in or close to buildings.

Retrieval, in particular automated retrieval, from a database of geodetic targets situated at the determined location can be used, in a development of the method according to the invention, to ascertain not only the position but also an, at least coarse, orientation of the geodetic surveying instrument, that is to say to determine a, at least coarse, comprehensive combination of the inner reference system of the surveying instrument with the absolute reference system.

From the known absolute position of one or more targets and a known orientation of the geodetic surveying instrument relative to the at least one target, it is possible to determine the absolute orientation of the surveying instrument using methods that are known to a person skilled in the art.

If the absolute position reference of the position-referenced image whose match is used to determine the position of the surveying instrument additionally allows ascertainment of absolute orientation data in respect of an actual or virtual recording direction, it is alternatively possible to ascertain an absolute orientation of the geodetic surveying instrument on the basis of a comparison of this actual or virtual recording direction of the stored image of the environment with the known recording direction of the recorded image of the environment. To this end, by way of example, it is possible for the "geotag" of a position-referenced image to contain not only the recording site but also the recording direction. If, alternatively, the position-referenced image is produced on the basis of a digital town model, for example, then the latter can be assigned not only a virtual, computed recording site but also a virtual, computed recording direction.

The method according to the invention can thus proceed fully automatically overall by means of a geodetic surveying instrument with motorized image recording means and appropriate control and evaluation algorithms, which allows simple and rapid performance. Hence, the method according to the invention advantageously allows automatic and fast provision of an at least coarse position and possibly orientation information item, particularly through the identification of the current location, which can be used as a basis for subsequent methods for precise position finding.

Apart from the direct recording of the image of the environment, i.e. the photography or scanning, for example, the method according to the invention additionally affords the advantage that method steps are not tied to one specific device. The production of an image from the recorded measurement data can, just like the remainder of the method steps, e.g. the derivation of volumes of data and the collation with reference images, i.e. reference volumes of data resulting therefrom, be effected by the geodetic surveying instrument and by external devices to which the measurement data have been transmitted, for example a cloud server. Similarly, the position-referenced data may be stored in the surveying instrument or be available in a further device, such as a mobile field controller. By way of example, the surveying instrument can produce a volume of data based on the current location from the measurement data, for example can extract geometric structures and send these data to a handheld further device such as a smartphone, where algorithms stored thereon are used to perform the collation on the basis of a stored or online retrievable database and identification of the location. The station coordinates are then transferred to the surveying instrument.

Beyond the actual position finding, an advantage of this image-based method is that subsequent geodetic measurement processes can be simplified thereby. By way of example, according to the invention, after the location has been determined, special environment points provided from a database can be marked in an image of the environment. These may be already measured targets, for example. The image of the environment can be the recorded or the matching image from the database, or a live image of the environment, if the geodetic instrument has an appropriate camera. The combination of image of the environment and targets can then be presented on an electronic display, for example, which allows a user to identify which targets have already been measured in the environment, and to specifically measure as yet undetermined targets. In addition, specific objects can be displayed on the image of the environment, for example buildings, whose image has been produced from a digital town model. It is therefore possible to establish whether objects that are really present are not yet available in digitized form in the model or whether alterations to objects that are already present are available and these are therefore relevant to measurement.

The method according to the invention affords advantages particularly in an environment that needs to be measured over a relatively long period and that is continually changing, as a result of which new targets are recurrently added. This is the case on a building site, for example, on which new buildings appear. It is then sufficient to stipulate surveying instrument locations once, to determine the absolute position thereof, if not yet available, as a one-off using another method and to store a respective image of the location environment. For measurements on later days that are meant to take place at the same locations, the method according to the invention affords simple identification, with little time involvement, of the respective location and targets that have not yet been measured because they have recently been added by construction activity.

BRIEF DESCRIPTION OF THE DRAWINGS

The position finding method according to the invention and the geodetic surveying instrument according to the invention are described in more detail below, purely by way of example, on the basis of exemplary embodiments that are shown schematically in the drawing.

Specifically,

FIG. 7a-c show a further example of collation according to the invention.

DETAILED DESCRIPTION

Figure 1:
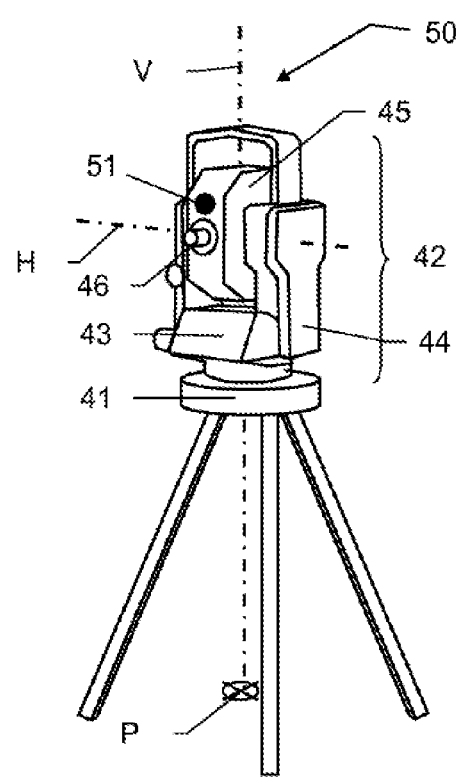
FIG. 1 shows an example of a geodetic surveying instrument according to the invention.

FIG. 1 shows a geodetic surveying instrument 50 according to the invention in the form of a total station and having a unit for producing an image of the environment 51 for measuring horizontal angles and vertical angles and distances to a target object that is at a distance and targeted.

The total station 50 can—as shown in FIG. 1—be arranged on a tripod, with a base 41 of the total station being connected to the tripod directly and permanently. The main body of the total station, which is called the superstructure 42, can be rotated relative to the base 41 about a vertical axis V. The position P of the geodetic surveying instrument is defined in the example by the point of intersection between the vertical axis V and the ground.

In this case, the superstructure 42 has a support 44—e.g. formed by two columns—, a sighting unit 45 mounted between the columns so as to be able to rotate about the horizontal tilt axis H, and an electronic data processing and display module, which is formed by a control and evaluation unit 43 and by a display. In addition, the superstructure 42 has the unit for producing an image of the environment 51, for example a digital camera, a scan module or a RIM camera. The control and evaluation unit is configured, in a known manner, to control the geodetic surveying instrument 50 and to process, display and store measurement data. In addition, the control and evaluation unit 43 is in a form such that it can be used to carry out the position finding method according to the invention, i.e. the control and evaluation unit 43 is configured to carry out the position finding method according to the invention.

The sighting unit 45 is arranged on the support 44 so as to be able to rotate about a horizontal tilt axis H and can therefore be swiveled or tilted horizontally and vertically relative to the base 41 for the purpose of orientation to a target object. In this case, the sighting unit 45 is embodied as a common sighting device unit having an emission unit 46 for emitting a laser beam, wherein normally at least one lens, a focusing optical system, a coaxial camera sensor, an optical sighting reticle plate and an eyepiece are arranged in or on a common housing of the sighting unit.

The sighting unit 45 can be used to target a target object and to sense the distance from the total station 50 to the target object by means of electrical sensor using the laser beam transmitted by the emission unit 46 and reflected by the target object. In addition, means for sensing the angular orientation of the superstructure 42 relative to the base 41 and of the sighting unit 45 relative to the support 44 by electrical sensor are provided. These measurement data captured by electrical sensor are supplied to the control and evaluation unit 43 and processed thereby, so that the position of the target relative to the total station 50 can be ascertained, graphically displayed and stored by the data processing and display module.

Figure 2A:
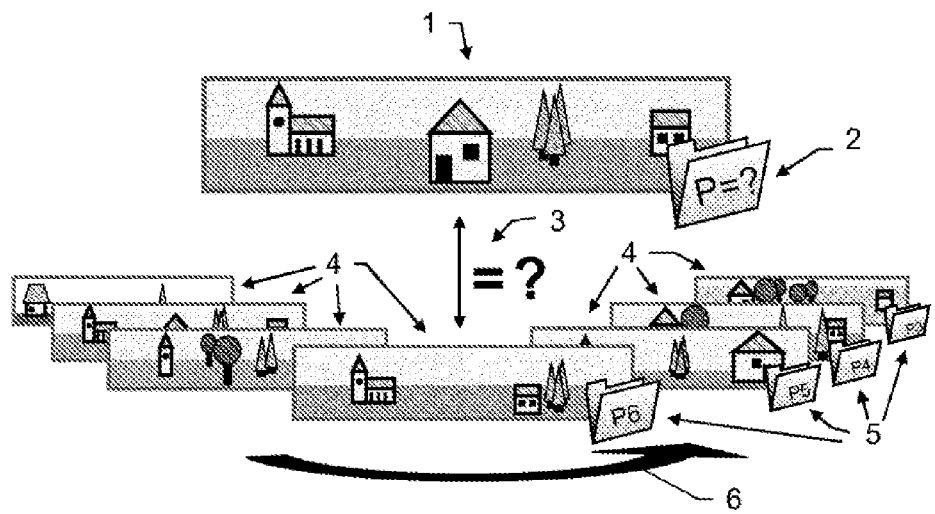
FIG. 2a-b show the basic representation of the collation according to the invention between recorded image and reference images and of the association of a position.
Figure 2B:
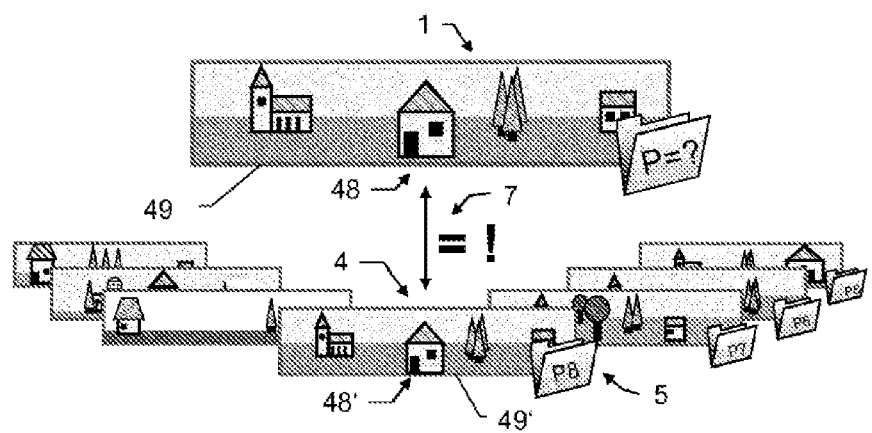

FIG. 2*a-b* show the principle of the image collation according to the invention and the resultant position finding. The image of the environment 1 in FIG. 2*a* has been recorded at the location P of the geodetic surveying instrument, so that as yet no position data 2 are combined with the image of the environment 1. Collation is now performed, that is to say a match is sought, 3, between this image 1 and a number of stored images or their corresponding volumes of data 4 with data of corresponding type in a database. In the example, the correspondence is ensured by virtue of all the images 1 and 4 being two-dimensional, photographically recorded panoramic images. The stored images 4 have position determination, since the position data 5 of the respective recording location, e.g. P6, is known and stored as well. According to the invention, position referencing may also be provided by virtue of the image as a whole, that is to say the whole of the volume of data representing the image, not having an associated absolute position, but rather at least one element of the data record on which the stored image is based on a volume of data produced from said data record having an explicitly associated absolute position. This at least one data volume or data record element may be the location corresponding to the image of the environment. Alternatively, it may be any other at least one element, provided that the absolute location coordinates can be computed therefrom. By way of example, it is thus possible for the data record of a 3D point cloud that has not been generated by a scan process close to the ground and hence does not have a recording location corresponding to the recorded image 1 directly available to have absolute referencing by single points as elements of the volume of data, from which single points it is possible for the absolute position of a virtual recording location close to the ground to be extracted by virtue of the known relative arrangement of the points. In the example, the individual reference images are compared sequentially with the currently recorded image 1, symbolized by the arrow 6. Nevertheless, according to the invention, the collation is not tied to the arrangement of the database images.

FIG. 2*b* shows that the current location of the geodetic surveying instrument is identified by virtue of a georeferenced image 4 having been found and selected that has a significant degree of match with the image of the environment 1 that has been recorded at the current location, 7. Therefore, the position information item 5 thereof, in the example P8, is adopted as recording site position and hence surveying instrument position, 8. A significant degree of match obtains when the criteria used for the collation, for example relative size and position in the image of individual objects, are identical within certain tolerance values for the recorded and referenced images 1 and 4. If this is true for a plurality of database images 4, then the one that has the smallest discrepancy among all of them is selected as matching or fresh collation is performed within this preselection according to additional criteria. Thus, according to the invention, since there just needs to be a significant degree of match, the current image of the environment 1 and the selected georeferenced image of the environment 4 and accordingly the current deployment and the recording positioning of the georeferenced image of the environment 4 do not need to be completely indistinguishable in order for them to be "the same" within the context of the invention. In the example shown in FIG. 2*a, b*, there is an offset of, by way of example, a few meters or a few tens of meters between the current deployment and the georeferenced recording point, the current deployment being situated somewhat closer to the depicted objects than the georeferenced recording point, which is shown in FIG. 2*b* by virtue of the distances 48 and 48' to the respective lower edge of the image 49 or 49' differing from one another in the respective matching images of the environment 4 and 5. Since the discrepancies are slight, i.e. are within the tolerance values, the current location is also identified with the georeferenced recording location under these circumstances, and the absolute position data P8 are associated with the current surveying instrument position. Accordingly, the adopted position data P8 do not match the real position of the current deployment exactly. The position data of the current surveying instrument position are thus determined coarsely according to the invention.

Such coarse position finding is not sufficient in every instance of application for geodetic precision demands, e.g. in respect of subsequent geodetic measurements. However, the coarse position finding according to the invention is a simple and fully automatable way of providing the prerequisite for precise position finding downstream of the method according to the invention using a method that is known to a person skilled in the art. By way of example, the location identified according to the invention allows easy and explicit location of, by way of example, a road junction, a building site, a plot of land or a section of elongated roadworks, georeferenced points in the environment, for example by looking them up in a database associated with the identified (recognized) location (e.g. the road junction). Put in general terms, the ascertained position data are taken as a basis for calling 2 position reference information items (in the example the georeferenced environment points), which can be used for precise position finding or specification of the surveying instrument position P as deployment determination. In the example, the precise position finding then involves the georeferenced points found for a free deployment being measured using the geodetic surveying instrument from the current deployment, this optionally be performed automatically and/or in automated fashion. The method according to the invention thus ultimately allows the position of the current surveying instrument position to be determined accurately from a geodetic point of view without the need for any prior knowledge of the current location or the current deployment.

Figure 3A:
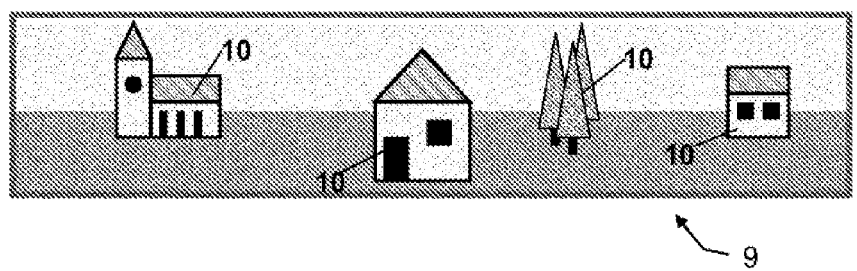
FIG. 3a-c show examples of images of the environment according to the invention.

FIG. 3a shows an example, according to the invention, of a recorded image of the environment. This is a panoramic image 9 that covers a visual range of 360°. Such an image can be produced by assembling a plurality of single photographs, recorded in different horizontal directions of view by a digital camera that the geodetic surveying instrument has. Appropriate motorization, particularly for swiveling the camera horizontally, and appropriate control and image processing programs allow this to take place in automated fashion. In the example, single environment objects 10, particularly buildings, are shown schematically. Data from the image of the environment 9, such as the relative position and size of objects 10, are the basis for the reference volume of data that is used to perform the subsequent image collation. By way of example, the required reference volume of data can also consist of data that describe the entire image 9 or subregions thereof, e.g. color histograms.

Figure 3B:
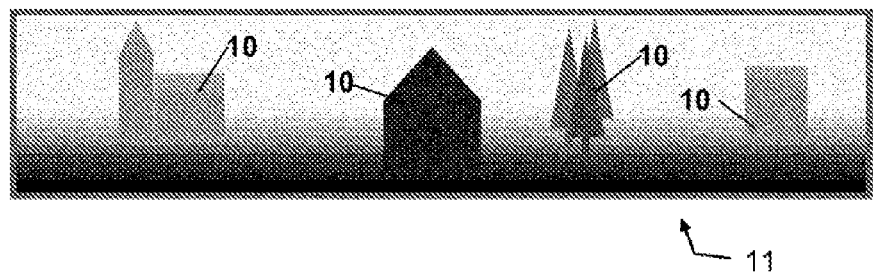

FIG. 3b shows a range panorama image 11 as an example of an image of the environment according to the invention. This may have been produced by a laser scan. Alternatively, a RIM camera may have been used for recording or a three-dimensional image may have been produced from two panoramic images recorded vertically with a slight offset. The visual range and the recording location correspond to those from FIG. 3a. The different distances between the surveying instrument and objects in the environment are visualized by different brightness values. In the example, a greater brightness means a greater distance.

Figure 3C:
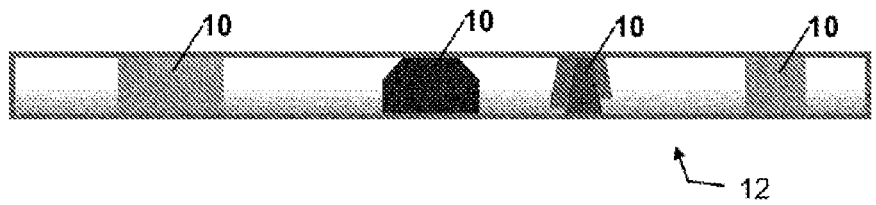

FIG. 3c shows a range panorama image 12 corresponding to the example from FIG. 3b with a smaller vertical environment detail in comparison therewith, so that only portions of the objects 10 are represented. The recording range in the horizontal direction continues to be 360°, and is now only 20°, for example, in the vertical direction. This may be sufficient depending on the environment structuring and collation method. The smaller capture angle means that the recording time is shorter in comparison with the recording time for the image from FIG. 3b, and the smaller volume of data that arises results in shorter processing times.

Figure 4A:
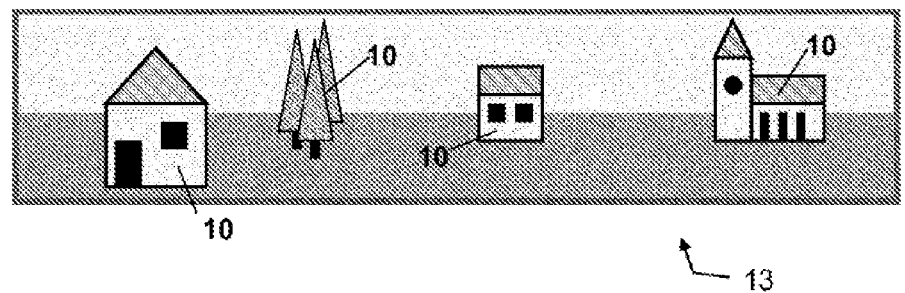
FIG. 4a-c show examples of position-referenced volumes of data according to the invention.

FIG. 4a shows an example of a stored georeferenced volume of data according to the invention. This is a volume of data that forms a panoramic image 13 that has been produced in the same manner as that from FIG. 2a and likewise covers a complete environment perimeter within a determined vertical visual range. The arrangement of the objects 10 in the image is different in comparison with the recorded image from FIG. 4a. Since the image data are otherwise at least largely identical, however, object-based collation identifies the two volumes of image data as the same, i.e. having a high degree of match, and associates the position data of the stored image 13 with the recorded image. The different arrangement does not indicate different recording sites but rather merely indicates a different azimuthal zero orientation for the respective recordings at the same location, which is unimportant for position finding on the basis of panoramic images. Optionally, in addition to the position, the orientation of the geodetic surveying instrument is determined from the known absolute zero orientation of the georeferenced recording site.

Figure 4B:
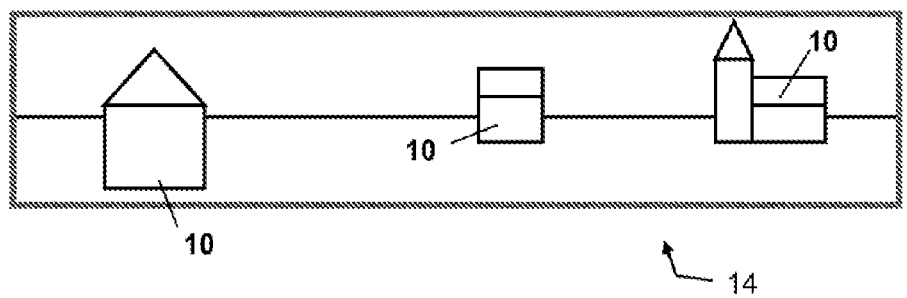

As a further example of a reference image according to the invention, FIG. 4b shows a virtual panoramic image 14 that has been computed from the information captured in a digital town model. The objects 10 are buildings, the size, shape and arrangement of which are calculated from the model data for a determined virtual recording location. An artificial image 14 of this kind can be computed for many positions in the region of the environment in question, for example of a street, e.g. in a regular arrangement at a distance of 100 meters from one another in each case, so that collatable images are available for a network of possible appropriate locations. The position on which the virtual image having the best match is based is then associated with the recorded image, that is to say adopted as the location of the surveying instrument. If a certain match with a plurality of position-referenced volumes of data manifests itself or if more accurate location ascertainment is desirable after first coarse position finding, then the previous steps can be repeated with a finer network of virtual recording sites, for example at a distance of ten meters, around the determined position region. Alternatively or additionally, when a correspondingly detailed digital town model is available, it is also possible to increase the level of detail of each artificial image 14 and hence of the volumes of data by also including, by way of example, façade features of the buildings, such as windows or doors.

Figure 4C:
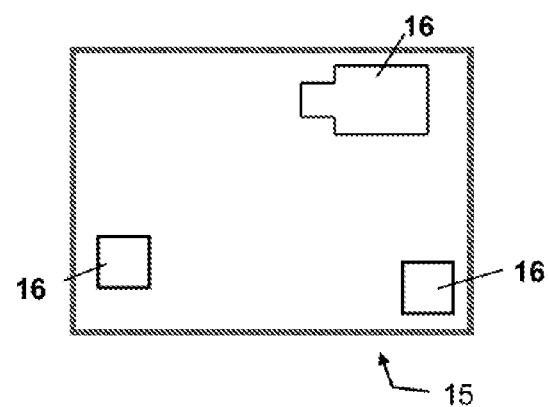

FIG. 4c shows a further example of a position-referenced volume of data according to the invention. This is manifested as a position-referenced image 15 in which the outlines 16 of buildings are reproduced. Such an image can be obtained or produced from satellite or aerial images, digital town models, field maps, construction plans or the like. According to the invention, the basis may also be three-dimensional images that are produced by means of lidar, ladar or radar (light or laser or radio detection and ranging). In contrast to the previous examples, the environment is shown from a plan view rather than from a side view. For the purpose of collation with position-referenced volumes of data obtained therefrom, a reference volume of data that is generated from an image of the environment with distance information, for example on the basis of a laser-based measurement in a horizontal plane, is therefore suitable.

Figure 5A:
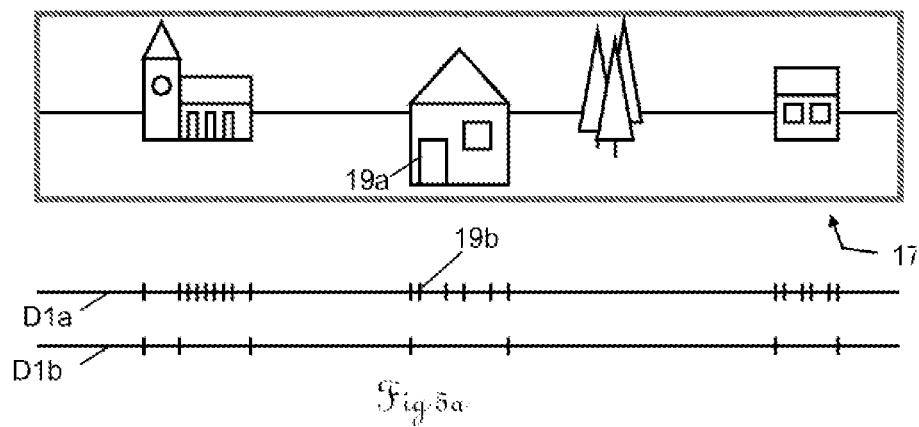
FIG. 5a-c show examples of collatable corresponding data types according to the invention.

FIG. 5a is a first example of a collatable data type. The corresponding data of the reference volume of data produced from the recorded image 17 and of a position-referenced volume of data are in this case descriptors D1a and D1b that are based on dominant vertical lines in a panoramic image. To this end, first of all an edge image is produced from the panoramic image by applying a Sobel, Prewitt, Laplace operator or the like thereto. This edge image is examined for dominant vertical lines, a line being regarded as dominant if it has or exceeds a stipulated minimum length. As a first example, FIG. 5a schematically shows a descriptor D1a that is based on vertical lines with a small lower limit, e.g. 50 pixels. For the purpose of illustration, a vertical line 19a that has at least this length is denoted, as a result of which it is part 19b in the descriptor D1a. This is evident from the left-hand edge of the door of the house in the foreground. A second example is a schematic representation of a descriptor D1b for a longer minimum length of relevant vertical lines, for example of 200 pixels. A match is then assumed for two descriptors that, within certain tolerances, have the same distribution of dominant lines. It then makes sense, for example, to use descriptors based on the finer categorization if collation with the descriptors based on a relatively long minimum length results in a plurality of possibly matching volumes of data.

Figure 5B:
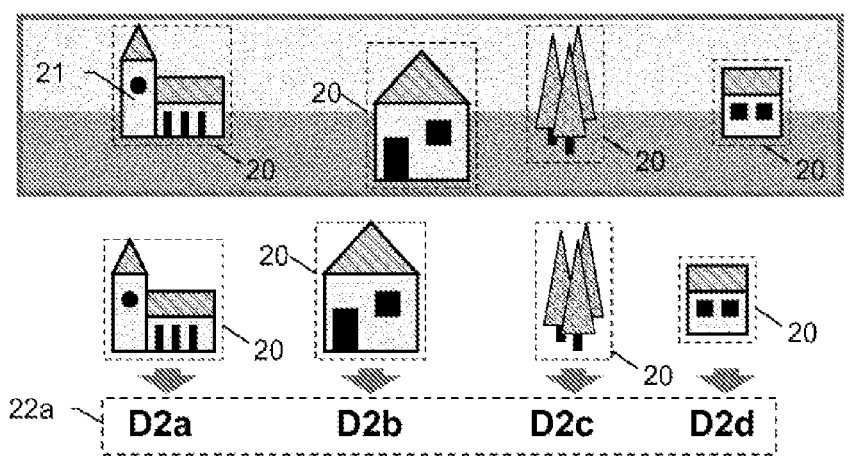

FIG. 5b shows a further example of data of corresponding type. In this case, these data relate not to the image as a whole but rather to subregions (subwindows) 20. These partial images 20 contain determined features. In the example, these are special structures that represent individual buildings and landscape features, e.g. the church building 21. Such structures can be worked out using feature recognition algorithms (interest point detection), for example. A respective descriptor D2a-D2d is then produced for every single structure, e.g. the church building 21. The sum total of all the descriptors then forms the volume of data used for collation, as descriptor record 22a.

Figure 5C:
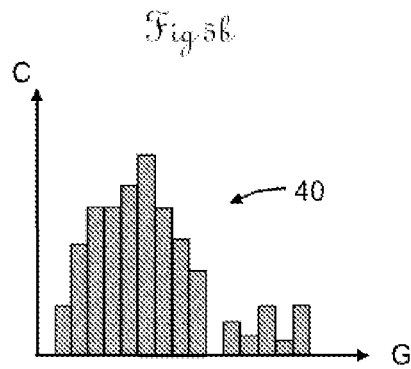

FIG. 5c is a third example of data of corresponding type that are used for performing the collation. In the example, a grayscale value histogram 40 is involved. The number C of pixels having a particular grayscale value G is plotted against the respective grayscale value. The histogram 40 is extracted from a black and white photograph with a grayscale value depth of 4 bits, which is why there are just 16 intensity levels. In order to achieve a sufficiently high level of information about the location environment, the invention prefers a greater grayscale value depth, for example in the range from 8 bits to 64 bits, particularly of at least 16 bits. Collation is effected on the basis of the respective data of the histogram of the image of the environment and the position-referenced images by comparing the frequencies of individual grayscale values or the grayscale value distributions overall.

Figure 6A:
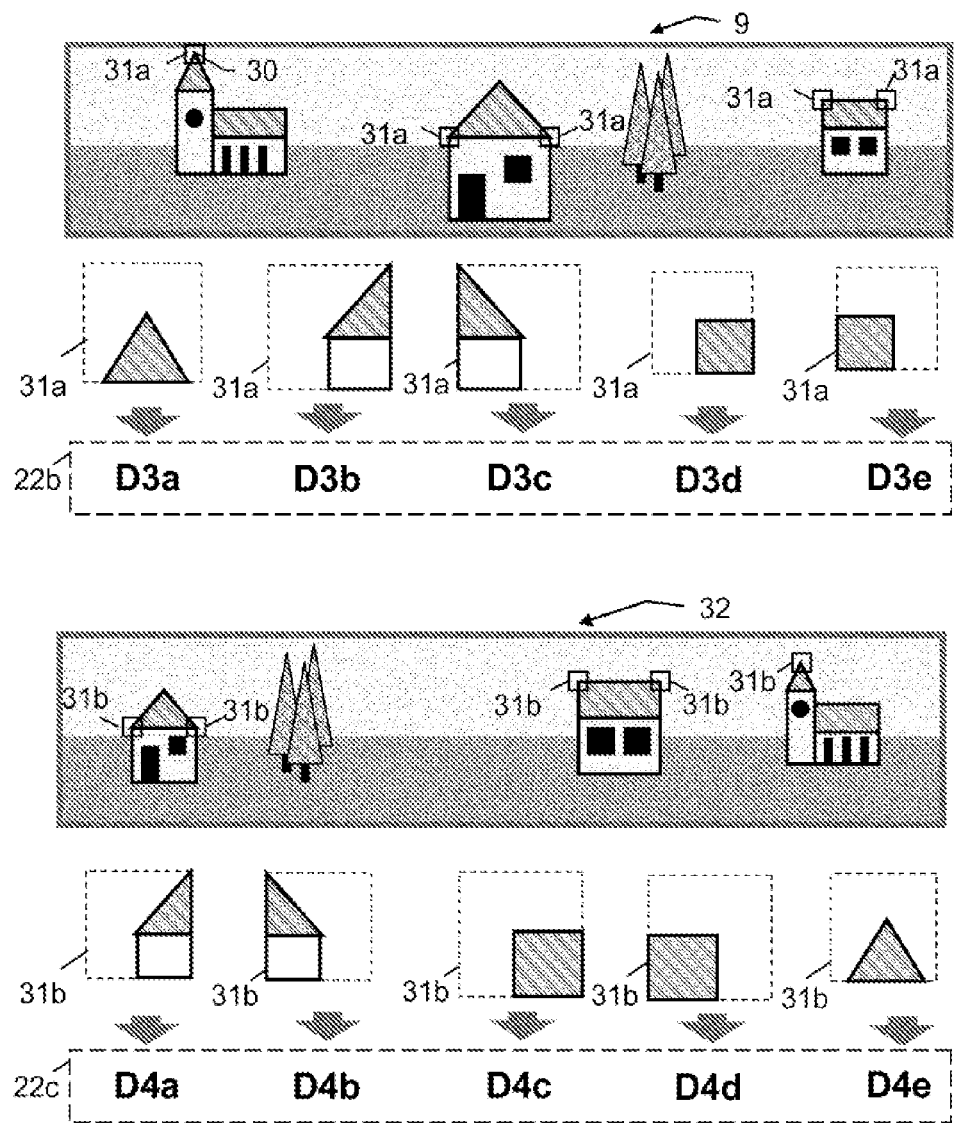
FIG. 6a-b show an example of collation according to the invention.
Figure 6B:
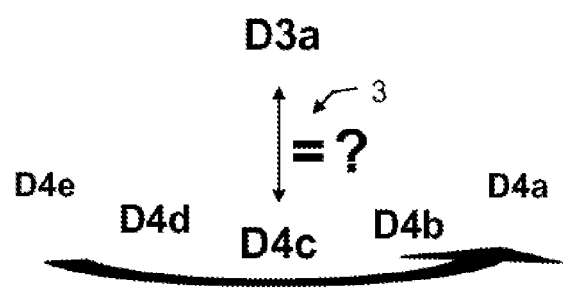
Figure 6B:
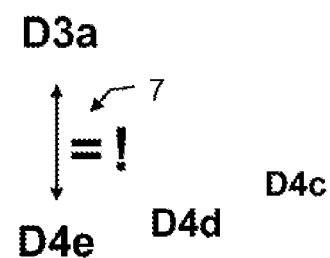

FIGS. 6a and 6b show an example of collatable data according to the invention and the collation thereof according to the invention. In FIG. 6a, distinctive structures are filtered out of an image of the environment in a first step. These are specific building corners and edges, for example the church spire 30. It is therefore possible to locate distinctive structures in the image. In the example, the environments of said structures again define a respective determined image detail 31a, 31b that is taken as a basis for computing a respective descriptor. For the recorded image of the environment 9, the reference volume of data obtained is a first descriptor record 22b comprising the descriptors D3a-D3e. For a stored position-referenced volume of data that can be presented as a position-referenced image 32, a second descriptor record 22c comprising the descriptors D4a-D4e is obtained in the example.

FIG. 6b shows the subsequent collation through comparison of the reference volume of data with the individual stored volumes of data. Instead of collating the volumes overall, the invention alternatively allows a volume of data to be regarded as a collection of the volumes of subdata, each consisting of the data for an individual descriptor, and the volumes of subdata to be compared with one another. By way of example, the descriptor D3a of the data record 22b is thus compared with all the descriptors of the data record 22c of a georeferenced image, that is to say equivalents for individual local structures of the recorded image are sought, 3. Instead of a "direct" data comparison, it is also possible for collation to be effected by virtue of classification of volumes of data. To this end, it is possible, by way of example, for individual descriptors to be categorized into classes, e.g. the class "church steeple roof spire", or for individual depicted objects ("church steeple") or a plurality of objects or the whole image ("houses") to be classified, e.g. on the basis of a plurality of descriptors. Such an approach can be implemented by virtue of classification on the basis of the "bag-of-features" method, for example.

In the example, the descriptors are of a design that is invariant in terms of size, e.g. by virtue of computation by means of SURF or SIFT algorithms, which is why a match is also found despite different scaling. Thus, in the recorded image 9, the spire of the church steeple roof 30 appears larger than in the stored image 32. The corresponding scale-invariant descriptors D3a and D4e are identified as the same, however, 7.

FIGS. 7a to 7c show a further example of collatable data according to the invention and the collation thereof according to the invention. The basis used is a three-dimensional image of the environment, e.g. a range image. In FIG. 7a, those points 33 that correspond to portions of building outlines that face the surveying instrument are filtered out of the corresponding 3D point cloud by means of image processing. If need be, it is also possible for relevant points to be produced from the data that are present by virtue of point projection onto the ground plane.

FIG. 7b shows how, in the next step, geometric structures, in the example sections or lines 34, which altogether form a reference volume of data 35 according to the invention, are fitted for associated points. In the case of other sets of points, distinguished points or geometric shapes such as arcs of circles or other curved lines or a combination thereof can be produced. Such a reference volume of data 35 according to the invention is suitable preferably for collation with position-referenced volumes of data 15 that represent building outlines 16 as data of corresponding type. According to the invention, such a volume of data 15 can be produced from images of the environment that are based on geographical terrain layouts or models, such as digital town models, construction plans, field maps, or from images of the environment that are produced from data recorded remotely from the ground, for example digital or digitized aerial or satellite images, as are available on the Internet, inter alia (see also FIG. 4c). The georeferenced volumes of data comprising the data pertaining to the building outlines are now collated 3 either with the reference volume of data comprising the filtered points 33 or, as delineated in FIG. 7c, from the geometric shapes 34 fitted therefrom. By way of example, the collation 3 is iterative optimization in which there is a significant degree of match if a minimum required identity quality can be achieved. For the method according to the invention, the ICP (iterative closest point) algorithm, for example, is suitable in this case.

Figure 8:
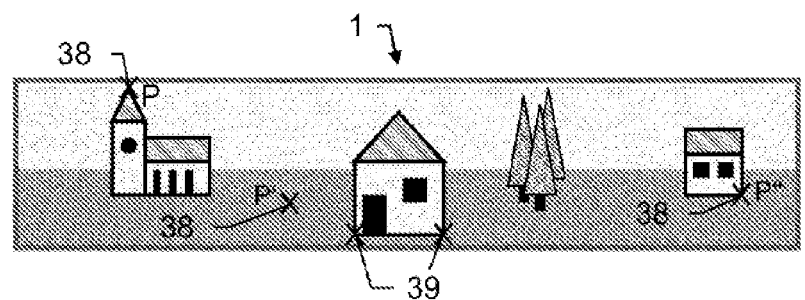
FIG. 8 shows an example of reuse, according to the invention, of an image of the environment for a subsequent geodetic measurement process.

FIG. 8 shows an example of further use, according to the invention, of an image of the environment for a subsequent selection of environment points that need to undergo geodetic measurement. After the location of the surveying instrument has been identified, that is to say its absolute position is known, environment points whose absolute position is already known are filtered out of a database. By way of example, this database may have been created from preceding geodetic measurements in the same environment. According to the invention, these points are marked in an image of the environment. In the example, the points 38 are overlaid on the image of the environment 1, this possibly also being the matching stored image. If the geodetic surveying instrument according to the invention has a camera, the points can also be overlaid on a live image of the environment. By virtue of display on an electronic display, the user can now identify which terrain points relevant to geodetic measurement have not yet had a position determined. In the example, these are distinctive points 39 on the house in the foreground. This provides a simple way of rapidly identifying which targets are possible for the current measurement task. This method is advantageous if it has not been possible to complete a measurement task at a location previously, for example. This task can then be continued simply and quickly according to the invention.

Figure 9:
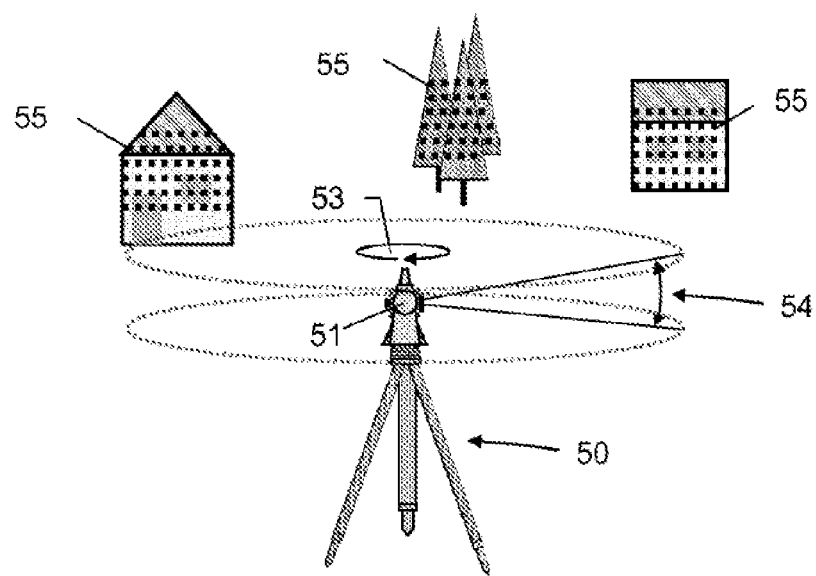
FIG. 9 shows an example of the recording, according to the invention, of an image of the environment using a geodetic surveying instrument according to the invention.

FIG. 9 shows an example of the method step of acquisition, according to the invention, of images of the environment using a geodetic surveying instrument according to the invention with a distance and angle measurement functionality, e.g. a total station or a theodolite. For this purpose, the geodetic surveying instrument 50, which has a unit 51 for producing an image of the environment, is positioned in a suitable manner. In addition, horizontal orientation can be performed. This is not a necessary prerequisite for the method according to the invention, however. Coarse horizontal orientation, as is normally obtained through simple erection, is adequate in principle, although more accurate horizontal orientation is useful for some of the possible collation methods. This can be accomplished by inclination sensors and motorized adjusting means of the surveying instrument or the image production unit 51 without user intervention. Next, an image of the environment is recorded according to the invention. In the example, the image production unit 51 is embodied as a laser scanner, which uses motorization to perform a 360° scan in a horizontal direction 53 with a defined vertical capture angular range 54, for example of 40°, in automated fashion. In this case, the distance and the direction of environment elements 55, in the example of points on object surfaces that are in the environment region, e.g. a house wall or regions of the ground surface, relative to the surveying instrument 50 are sensed. From the measurement data, an evaluation unit inside the instrument produces a 3D point cloud that can be presented as a range panorama image, that is to say as a panoramic image with depth information, which image can be displayed to the user on a display of the surveying instrument 50 according to the invention. Alternatively, the measurement data processing and the display can also take place on an external device, for example a laptop, to which the surveying instrument 50 has a communication link.

What is claimed is:

1. A method for determining the position data of a geodetic surveying instrument, wherein the method comprises:
   recording a panoramic image, a 360° three-dimensional scan or a range panorama image of the environment of at least one contiguous region of the environment of the surveying instrument position to be determined,
   providing a multiplicity of stored position-referenced volumes of data from position-referenced data records,
   extracting a reference volume of data consisting of read or derived data of one image of the environment by means of image processing, wherein each position-referenced volume of data and the reference volume of data have data of corresponding type,
   collating the reference volume of data with the provided position-referenced volumes of data with identification of matches between reference volume of data and a respective individual position-referenced volume of data,
   selecting that position-referenced volume of data that has a comparatively significant degree of match with the reference volume of data,
   ascertaining the position data of the surveying instrument position on the basis of position reference of the selected position-referenced volume of data.

2. The method as claimed in claim 1, wherein:
the ascertained position data represent a coarse position information item as identified recording location,
the ascertained coarse position data are taken as a basis for retrieving position reference information stored in a database for the recording location in the environment, which position reference information is used for refined determination of the position data, wherein the refined determination on the basis of a plurality of geodetic reference points in the environment (as the position reference information) that, following ascertainment of the position data, are automatically retrieved from a database associated with the ascertained position data or the identified recording location, and
the refined determination of the position data is effected on the basis of the position reference information, wherein the position reference information is geodetic reference points in the environment that are geodetically measured by means of the geodetic surveying instrument, and the deployment is determined therefrom.

3. The method as claimed in claim 1, wherein:
the recording of an image of the environment is effected by photographing or laser scanning, wherein environment elements recorded in the process cover the at least one contiguous region of the environment with a prescribed minimum density.

4. The method as claimed in claim 1, wherein:
a position-referenced volume of data is provided by using the whole or a portion of a digital position-referenced data record or from the whole or a portion of produced data of a digital position-referenced data record
   of an image of the environment, produced by photographing or laser scanning, that is recorded close to the ground,
   of a geographical terrain map or model, or
   of an image of the environment produced from data recorded remotely from the ground, which is produced specifically by means of light, laser or radio detection and ranging,
wherein a digital data record is used to produce a plurality of position-referenced volumes of data that are each obtained for a different virtual recording location, close to the ground, for an image of the environment that is produced from the data record,
wherein the virtual recording locations close to the ground, which are at a regular distance from one another, are situated within a particular region of terrain.

5. The method as claimed in claim 1, wherein:
a position-referenced volume of data is position-referenced by virtue of at least one data volume element(s) or the whole of the data volume elements having an explicitly associated absolute position or being able to be explicitly assigned an absolute position on the basis of at least one position reference of the underlying position-referenced data record.

6. The method as claimed in claim 1, wherein:
data of corresponding type are data that describe the whole image of the environment or the digital data record or at least one subregion and/or aspect or property of the respective whole image of the environment or of the respective whole digital record.

7. The method as claimed in claim 6, wherein the data comprises data of captured or computed points or structures, or geometric primitives.

8. The method as claimed in claim 6, wherein the data comprise data of a statistical type, signatures, histograms, specifically color or grayscale value histograms or histograms from surface normals, gradients or functions, brightness gradients or probability functions.

9. The method as claimed in claim 6, wherein the data comprises one more items selected from the list consisting of translation-invariant descriptors, rotation-invariant descriptors, illumination-invariant descriptors, scale-invariant descriptors, geometrical, color-based and/or intensity-based descriptors, statistical descriptors, histogram of oriented gradients, histogram of local binary patterns, and structure tensor.

10. The method as claimed in claim 6, wherein a subregion is defined as the surroundings of distinctive structures or points or is ascertained by image resolution by means of a sliding window process.

11. The method as claimed in claim 6, wherein the data comprises relative position data.

12. The method as claimed in claim 1, wherein:
the collation takes place by means of classification formation of at least one measure of distance or a correlation function.

13. The method as claimed in claim 1, wherein:
the ascertainment of the surveying instrument position is adoption of the absolute position data of a real or computed recording location associated with the selected position-referenced volume of data.

14. The method as claimed in claim 1, wherein:
ascertainment of an, at least coarse, surveying instrument orientation is effected on the basis of referenced orientation data of the selected position-referenced volume of data, by comparison of recording directions of the recorded image of the environment and the selected position-referenced volume of data.

15. The method as claimed in claim 1, wherein:
the generation of at least one quality indicator for at least one computation result, is displayed to the user on an electronic display.

16. The method as claimed in claim 1, wherein:
determination of a surveying instrument position advance information item, by means of ascertainment of the mobile radio cell that contains the geodetic surveying instrument, and selection of position-referenced data records on the basis of the surveying instrument position advance information item.

17. The method as claimed in claim 1, wherein:
transfer of the data of the image of the environment following recording, and surveying-instrument-external execution of the further method steps on a smartphone or by cloud services.

18. The method as claimed in claim 1, wherein:
marking of distinguished points and/or objects, which are automatically ascertained from a database associated with the ascertained position, in an image of the environment of the for surveying instrument position.

19. The method as claimed in claim 1, wherein: automated execution of individual method steps.

20. A geodetic surveying instrument comprising:
a superstructure that is arranged on a base and that can swivel about a swivel axis,
a sighting unit, wherein the sighting unit has at least one emission unit, defining an optical target axis, for emitting a laser beam and a distance measurement functionality for measuring a distance to an object,
an angle measurement functionality for high-precision capture of at least one swivel angle defined by a relative swivel position of the superstructure in relation to the base, and
a control and evaluation unit,
a unit for producing an image of the environment,
wherein the control and evaluation unit is designed such that it can be used to carry out the method as claimed in claim 1.

21. A non-transitory computer program product, which is stored on a machine-readable storage medium, or computer data signal, embodied by an electromagnetic wave, with program code that is suitable for taking a recorded image of the environment of a geodetic surveying instrument and using the method as claimed in claim 1 to determine the absolute position data of the surveying instrument.

22. A method for determining the position data of a geodetic surveying instrument, wherein the method comprises:
recording an image of the environment with an angular range of at least 130° of at least one contiguous region of the environment of the surveying instrument position to be determined,
providing a multiplicity of stored position-referenced volumes of data from position-referenced data records,
extracting a reference volume of data consisting of read or derived data of one image of the environment by means of image processing, wherein each position-referenced volume of data and the reference volume of data have data of corresponding type,
collating the reference volume of data with the provided position-referenced volumes of data with identification of matches between reference volume of data and a respective individual position-referenced volume of data,
selecting that position-referenced volume of data that has a comparatively significant degree of match with the reference volume of data,
ascertaining the position data of the surveying instrument position on the basis of position reference of the selected position-referenced volume of data.

* * * * *